(12) United States Patent
Grim et al.

(10) Patent No.: US 10,996,548 B2
(45) Date of Patent: May 4, 2021

(54) TRUSS-MOUNTED SECURITY DEVICE

(71) Applicant: Robert Bosch GmbH, Stuttgart (DE)

(72) Inventors: Luke D. Grim, Harrisburg, PA (US); Scott Canupp, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/712,180

(22) Filed: Dec. 12, 2019

(65) Prior Publication Data
US 2020/0209720 A1 Jul. 2, 2020

Related U.S. Application Data

(60) Provisional application No. 62/786,129, filed on Dec. 28, 2018.

(51) Int. Cl.
| | |
|---|---|
| *G03B 17/56* | (2021.01) |
| *H04N 7/18* | (2006.01) |
| *G08B 13/196* | (2006.01) |
| *H04N 5/225* | (2006.01) |
| *F16M 13/02* | (2006.01) |
| *E04B 9/00* | (2006.01) |

(52) U.S. Cl.
CPC ......... *G03B 17/561* (2013.01); *F16M 13/027* (2013.01); *G08B 13/19632* (2013.01); *H04N 5/2252* (2013.01); *H04N 5/2253* (2013.01); *H04N 7/183* (2013.01); *E04B 9/006* (2013.01)

(58) Field of Classification Search
CPC .... F16M 13/027; E04B 9/006; G03B 17/561; G08B 13/19632
See application file for complete search history.

(56) References Cited

U.S. PATENT DOCUMENTS

| | | | | |
|---|---|---|---|---|
| 4,238,098 A | * | 12/1980 | Siegfried | F16L 3/243 248/217.2 |
| 4,544,119 A | | 10/1985 | Kellett et al. | |
| 4,805,855 A | * | 2/1989 | Kirby | E04B 9/18 248/58 |
| 5,940,122 A | | 8/1999 | Kizawa et al. | |
| 6,290,568 B1 | | 9/2001 | Hou | |
| 6,390,568 B1 | | 5/2002 | Tozu et al. | |
| 7,374,057 B2 | * | 5/2008 | Hendrickson | H02G 3/20 174/50 |

(Continued)

OTHER PUBLICATIONS

Steel Joist Institute, "Steel Joist Girder Research," <https://steeljoist.org/> webpage available as early as Dec. 7, 1998.

(Continued)

*Primary Examiner* — John Villecco
(74) *Attorney, Agent, or Firm* — Michael Best & Friedrich LLP

(57) ABSTRACT

A security device adapted to mount within a ferromagnetic truss includes a sensing element, a first housing portion provided around the sensing element, a second housing portion positioned above the first housing portion and provided around a circuit board electrically coupled to the sensing element, a magnet provided on the first housing portion and operable to magnetically couple the security device to the ferromagnetic truss, and a retention clip provided on the second housing portion and operable to automatically secure the security device within the truss when inserted from below.

20 Claims, 13 Drawing Sheets

(56) References Cited

U.S. PATENT DOCUMENTS

| | | | |
|---|---|---|---|
| 7,410,140 B2* | 8/2008 | Hartwick | F16B 2/065 |
| | | | 248/237 |
| 7,819,371 B2* | 10/2010 | Panasik | F16L 3/24 |
| | | | 248/327 |
| 7,967,272 B2* | 6/2011 | Nilsen | E04B 9/006 |
| | | | 248/339 |
| 8,525,626 B2* | 9/2013 | Tait | H01F 7/0252 |
| | | | 335/285 |
| 8,776,469 B2* | 7/2014 | Morey | F16B 7/0493 |
| | | | 52/506.06 |
| 9,163,402 B2 | 10/2015 | Kabatsi et al. | |
| 9,322,509 B2 | 4/2016 | Newhouse | |
| 9,518,699 B2 | 12/2016 | Newhouse | |
| 9,521,301 B2 | 12/2016 | Bart | |
| 9,631,767 B2 | 4/2017 | Kilgore et al. | |
| 9,674,411 B2 | 6/2017 | Cover | |
| 9,739,416 B2 | 8/2017 | Newhouse | |
| 9,970,593 B2 | 5/2018 | Newhouse | |
| 2002/0171557 A1* | 11/2002 | Wegener | G08B 13/19634 |
| | | | 340/693.6 |
| 2005/0055945 A1* | 3/2005 | Hartwick | F21V 21/02 |
| | | | 52/633 |
| 2005/0252135 A1* | 11/2005 | Hartwick | F21S 8/06 |
| | | | 52/506.06 |
| 2006/0254190 A1 | 11/2006 | Hunt | |
| 2008/0302033 A1* | 12/2008 | Insalaco | B66C 7/04 |
| | | | 52/220.2 |
| 2014/0332650 A1* | 11/2014 | Newhouse | H04N 7/183 |
| | | | 248/339 |
| 2014/0363148 A1* | 12/2014 | Mohan | G03B 17/561 |
| | | | 396/427 |
| 2016/0003412 A1 | 1/2016 | DeRose | |
| 2016/0201846 A1* | 7/2016 | Newhouse | H04N 7/183 |
| | | | 52/741.1 |
| 2016/0360656 A1 | 12/2016 | Larsson | |
| 2017/0082243 A1* | 3/2017 | Newhouse | F16M 13/027 |
| 2017/0307135 A1* | 10/2017 | Newhouse | F16M 13/027 |
| 2018/0011390 A1 | 1/2018 | Goulden et al. | |
| 2018/0013934 A1 | 1/2018 | Germe et al. | |
| 2018/0051827 A1 | 2/2018 | Garvin | |

OTHER PUBLICATIONS

Steel Joist Institute, "Standard Specifications and Load Tables, Longspan Steel Joist LH-Series and Deep Longspan Steel Joist DLH-Series," American National Standard—SJI-LH/DLH-1.1, 2005, pp. 49-61.

Vulcraft, "Steel Joists and Joist Girders," 2001, 130 pages.

Eng-Tips.com, Engineering Forums, "Rage of widths for steel joists," <https://www.eng-tips.com/viewthread.cfm?qid=261921> Thread 507-261921, Dec. 29, 2009.

* cited by examiner

--PRIOR ART--

US 10,996,548 B2

TRUSS-MOUNTED SECURITY DEVICE

CROSS-REFERENCE TO RELATED APPLICATIONS

This application claims priority to U.S. Provisional Patent Application No. 62/786,129, filed Dec. 28, 2018, the entire contents of which are incorporated by reference herein.

BACKGROUND

The present disclosure relates to security devices and mounting arrangements for security devices.

SUMMARY

In one aspect, the invention provides a security device adapted to mount within a ferromagnetic truss includes a sensing element, a first housing portion provided around the sensing element, a second housing portion positioned above the first housing portion and provided around a circuit board electrically coupled to the sensing element. A magnet is provided on the first housing portion and operable to magnetically couple the security device to the ferromagnetic truss. A retention clip is provided on the second housing portion and operable to automatically secure the security device within the truss when inserted from below.

In another aspect, the invention provides a method of mounting a security device to a truss. The security device includes a first housing portion and a second housing portion and the truss includes two spaced beams defining a slot therebetween. The second housing portion is aligned with the slot. The second housing portion is inserted into the slot. The security device is automatically secured to the truss by the insertion of the second housing portion into the slot.

In yet another aspect, the invention provides a security device adapted to mount within a slot of a ferromagnetic truss, the slot having a standardized width of one inch. The security device includes a sensing element and a first housing portion containing the sensing element. The first housing portion extends in an axial direction from a lens to a rear surface of the first housing portion. The first housing portion has a width at the rear surface of greater than one inch measured perpendicular to the axial direction. The security device further includes a second housing portion attached to the first housing portion. The second housing portion contains a circuit board electrically coupled to the sensing element. The second housing portion has a width of less than one inch measured parallel to the width of the first housing portion. A magnet is coupled to the first housing portion and operable to magnetically couple the first housing to the ferromagnetic truss.

DETAILED DESCRIPTION

Figure 1:
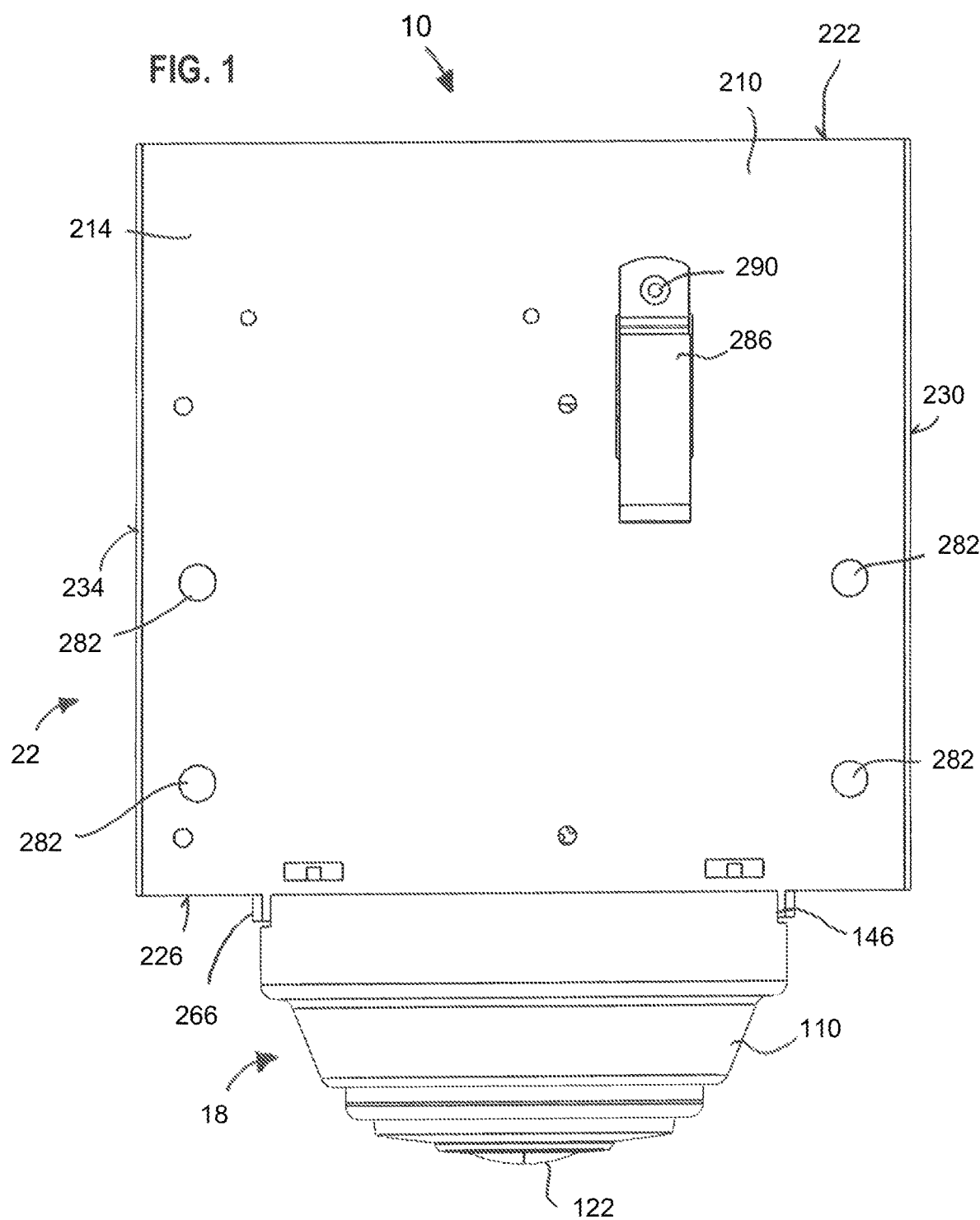
FIG. 1 is a side view of a security device in the form of a camera, according to one embodiment of the present disclosure.
Figure 2:
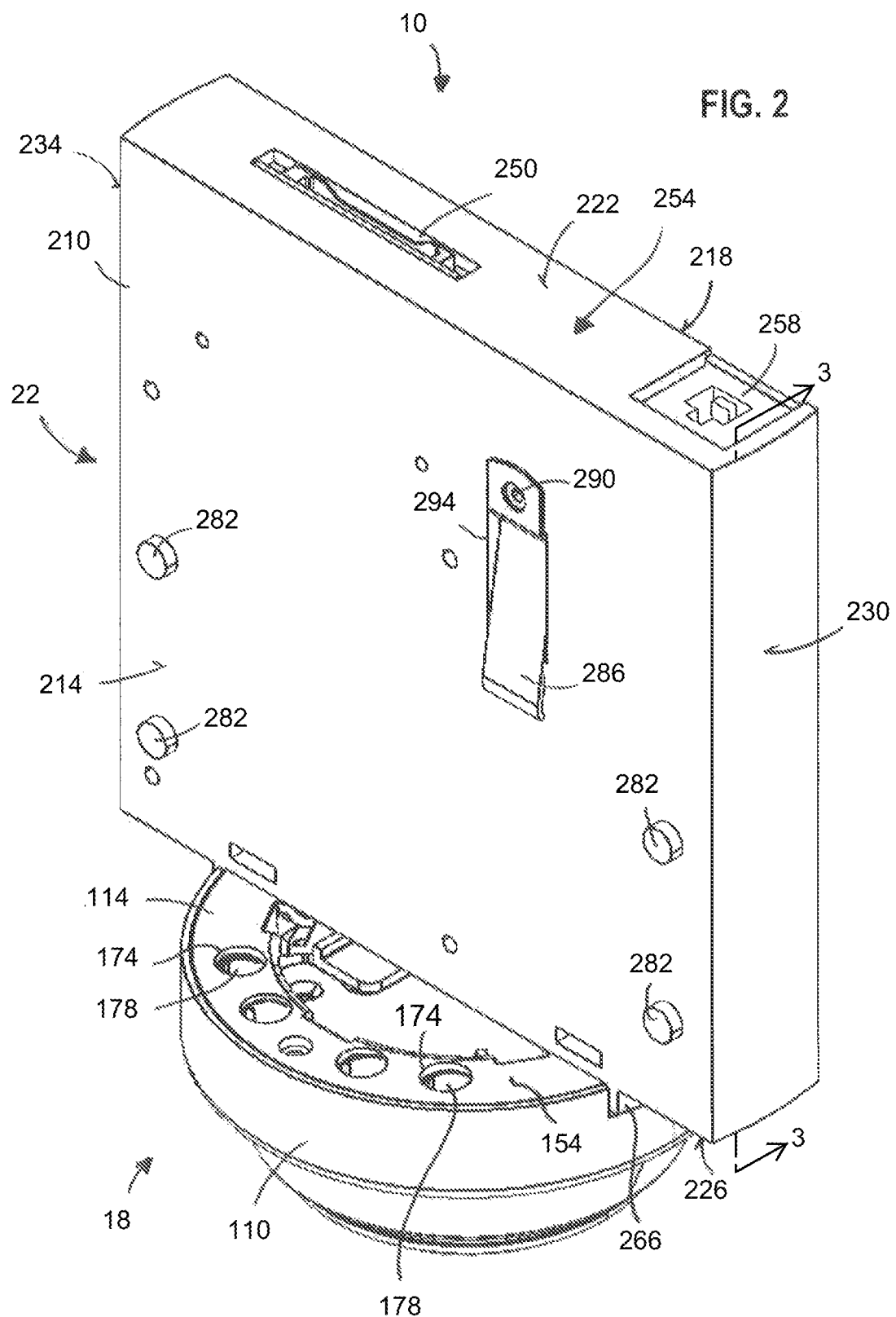
FIG. 2 is a perspective view of the camera of FIG. 1.

FIGS. 1-2 illustrate a security device in the form of a camera 10, e.g., a security or surveillance camera. The camera 10 is one example of a building security device. However, aspects of the camera 10 illustrated and described herein can, in additional embodiments, be applied to other security devices including, but not limited to: a thermal imaging camera, an infrared (IR) sensor, a fire sensor, a carbon monoxide sensor, or another building-mountable device for improving the security and/or safety of a building or area. As shown, the camera 10 includes a first or lower portion 18 and a second or upper portion 22. As will be appreciated from the following disclosure, the first portion 18 forms a head of the camera 10, and the second portion 22 forms a body of the camera 10, and the terms "upper" and "lower" refer specifically to a particular mounting configuration for which the camera 10 is adapted. Thus, the terms "upper" and "lower" are used throughout for convenience and in relation to the orientation as illustrated in the figures.

As shown in FIGS. 1-4, the lower portion 18 includes an outer housing or shell 110 that at least partially surrounds components within the lower portion 18. The outer housing 110 is made of a molded plastic, though other materials (e.g., metal) may be used in the alternative or in addition. The outer housing 110 is mounted to a chassis 114 positioned within the outer housing 110. The chassis 114 provides structure and rigidity to the outer housing 110. A camera head assembly 118 (FIG. 3) of the camera 10 is additionally mounted (at least partially) within the outer housing 110. The camera head assembly 118 includes the lens or lens assembly 122 mounted within an opening in the outer housing 110, an image sensor 126, an image sensor circuit board assembly 130, and a filter 134. The lens 122 is aligned with the image sensor 126 to transmit light to the image sensor 126. The filter 134 adjusts the amount of light supplied to the image sensor 126 through the lens 122. The lens 122, as shown, is a fish eye lens capable of providing a large field of view without necessitating movement of the lens 122. In other embodiments, the camera 10 has a rotatable lens and/or rotatable housing portion.

Figure 5:
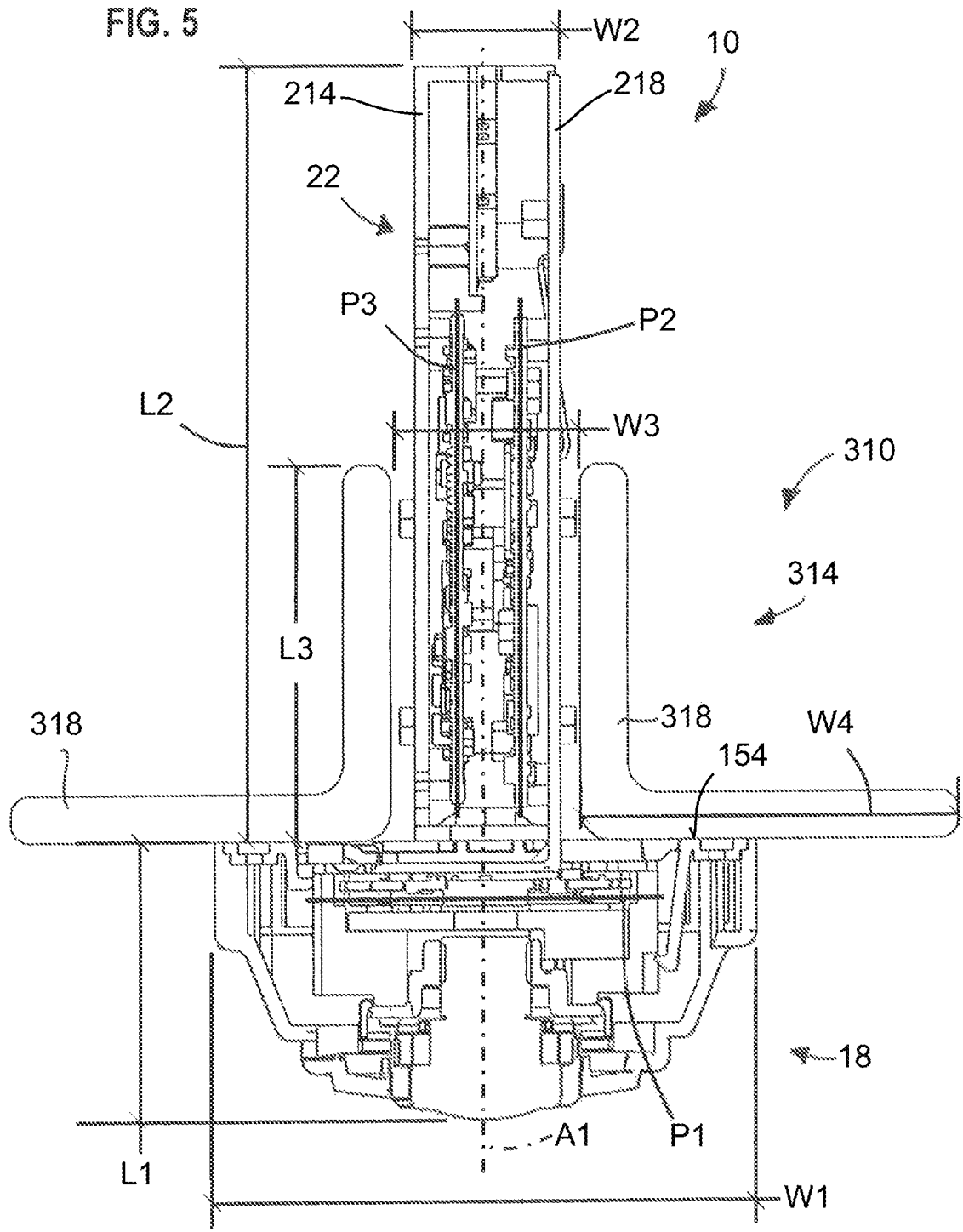
FIG. 5 is a cross-section view taken along line 5-5 of FIG. 8 of the camera of FIGS. 1-4 mounted within a truss, illustrating various measurements and planes.

The image sensor 126 is part of the image sensor circuit board assembly 130 and captures the light passing through the lens 122. The image sensor circuit board assembly 130 converts the captured image to an electrical signal. As shown in FIG. 5, the image sensor 126 defines an image sensor axis A1 defined as the axis normal to the image sensor 126 and as the axis along which light passes from the center of the lens 122 to the image sensor 126. The image sensor circuit board assembly 130 includes a printed circuit board substrate having opposing planar faces connected by edges. As shown in FIG. 5, the planar face of the substrate of the image sensor board assembly 130 defines a first plane P1. As the image sensor 126 is mounted to a planar face of the image sensor board assembly 130, the first plane P1 is normal to the image sensor axis A1.

Figure 3:
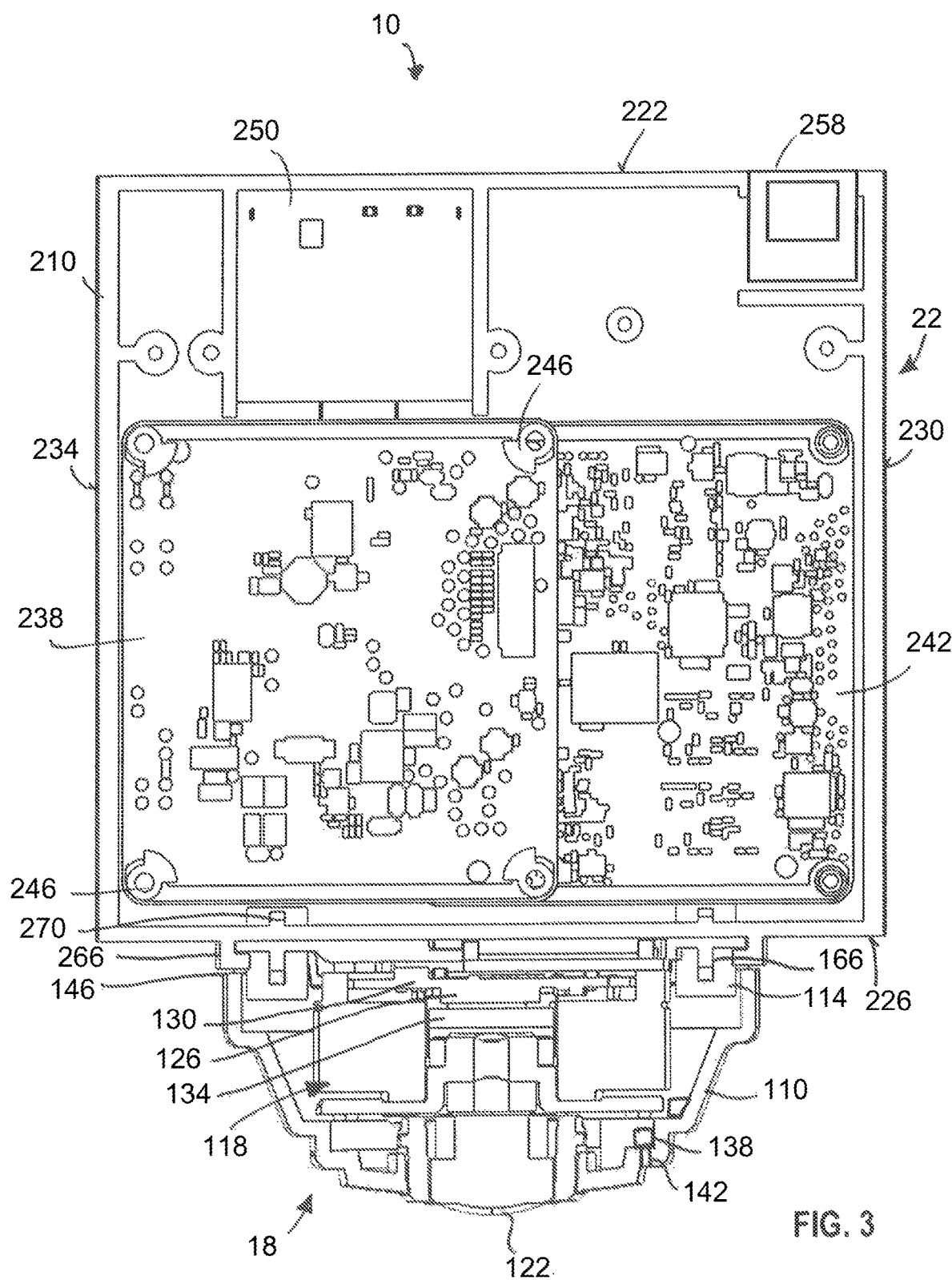
FIG. 3 is a cross-section view of the camera, taken along line 3-3 of FIG. 2.
Figure 4:
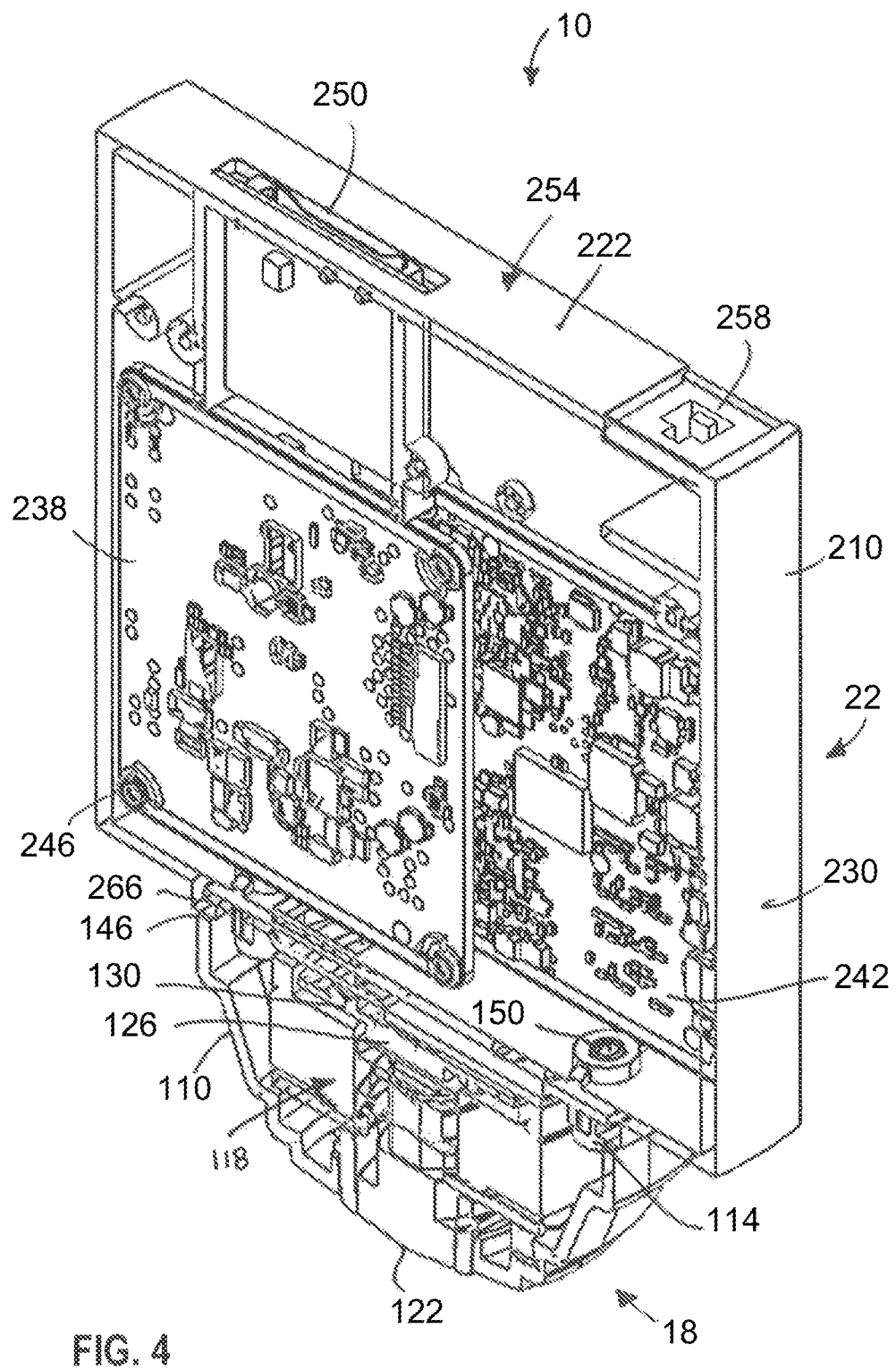
FIG. 4 is a perspective view of the camera cross-section of FIG. 3.

With reference to FIG. 3, the lower portion 18 further includes a microphone 138 configured to detect sounds, which may be recorded in combination with the images captured by the image sensor 126. The microphone 138 is positioned at or adjacent to an aperture 142 in the outer housing 110 such that the microphone 138 is predominantly or wholly located within the lower portion, or particularly within the outer housing 110.

The lower portion 18 can include an attachment structure 146 that couples to the upper portion 22, and furthermore, the upper and lower portions 18, 22 may be fastened together via one or a plurality of fasteners 150, as described in greater detail below.

As shown in FIG. 5, the lower portion 18 has a width W1, and a length L1. The width W1 and the length L1 are defined, respectively, as the maximum width and maximum length of the lower portion 18 and are substantially defined by the size of the outer housing 110. The outer housing 110 is dome-shaped having a substantially consistent cross-section rotated about the image sensor axis A1. The length L1 of the lower portion 18 extends from the lens 122 to a flat, rear surface 154 of the lower portion 18. As shown in FIG. 2, the rear surface 154 is defined by the chassis 114. In some embodiments, the rear surface 154 of the lower portion 18 may be formed by the outer housing 110 extending around the rear of the chassis 114.

Referring once again to FIGS. 1-4, the upper portion 22 includes an outer housing or shell 210 that at least partially surrounds components within the housing 210. The outer housing 210 is substantially a rectangular prism defined by a first sidewall 214, a second sidewall 218, an upper wall 222 (or rear wall with respect to the camera view along the image sensor axis A1), a lower wall 226 (or front wall with respect to the camera view along the image sensor axis A1), a third sidewall 230, and a fourth sidewall 234. The upper portion 22 may be formed (e.g., molded) of plastic or metal. The first and second sidewalls 214, 218, constituting a first pair of opposed sidewalls, are rectangular panels positioned opposite one another and have a greater area than the other walls 222, 226, 230, 234 of the upper portion 22. The upper and lower walls 222, 226 extend between the first pair of sidewalls 214, 218 with the lower wall 226 located at the lower portion 18 when the upper and lower portions 18, 22 are assembled. The upper wall 222 is positioned opposite the lower wall 226 and is spaced apart from the lower portion 18. As shown in FIG. 2, some of the walls, such as the third and/or fourth sidewalls 230, 234, may be formed with some curvature for structural rigidity such that the upper portion 22 substantially forms a rectangular prism despite not consisting entirely of flat surfaces as a perfect rectangular prism.

As shown in FIG. 5, the upper portion 22 has a width W2, and a length L2. The width W2 is the width between the two sidewalls 214, 218, which, as shown, is smaller than the width W1 of the lower portion 18. The width W2 is the smaller of two dimensions of the upper portion 22 measured perpendicular to the image sensor axis A1. The length L2 of the upper portion 22 is the distance between the lower wall 226 (at the lower portion 18) and the upper wall 222, which as shown, is greater than the length L1 of the lower portion 18.

The upper portion 22 defines an interior volume in which a power circuit board assembly 238 and an encoder circuit board assembly 242 are mounted. The power circuit board assembly 238 controls activation of and power supplied to the encoder and image sensor circuit board assemblies 242, 130. The encoder circuit board assembly 242 manipulates and interprets the electrical signals from the image sensor circuit board assembly 130 prior to sending the data to an onboard storage device, such as an SD card positioned within an SD card slot 250, or to an external storage device (not shown). In some constructions, the onboard memory is used to store the most recent footage corresponding to a predetermined or selectable duration (e.g., the last 30 minutes), while all data is sent (e.g., via Ethernet) to external storage. An LED 262 positioned on the lower wall 226 of the upper portion 22 is electrically coupled to the board assemblies 238, 242 to indicate a status of the camera 10 (e.g., on or off, data transmission status, alarm status, etc.).

The encoder circuit board assembly 242 may further implement intelligent video analysis (IVA) that analyzes motion sensing, frequency of traffic, and other visual and audio inputs. Implementing IVA at the camera allows the camera to send only the necessary metadata to the external storage device, and not the raw data. This decreases the amount of bandwidth used by the camera 10 and decreases strain on the network. The image sensor board 242, power circuit board assembly 238, and encoder circuit board assembly 242 may be electrically coupled to one another via ribbon cables and/or micro-coaxial cables.

The upper wall 222 of the upper portion 22 includes a port panel 254 having a plurality of ports for electrically coupling the camera 10 to external devices. The port panel 254 shown includes the SD card slot 250 and further includes an Ethernet port 258. The camera 10 shown utilizes Power over Ethernet (PoE) such that the power provided to the camera 10 is provided via an Ethernet cable inserted into the Ethernet port 258. The Ethernet cable is additionally utilized to transmit data from the camera 10 to the external storage device. In other embodiments, the port panel 254 includes any one or more of a separate power port, USB ports for communicating with external storage or other peripheral devices, and alarm input/output ports. In some embodiments, if the camera 10 requires a relatively low amount of energy, the upper portion 18 may support a power source, such as a battery.

One or both of the first pair of sidewalls 214, 218 includes bosses 246 that extend into the interior volume of the upper portion 22 as mounting surfaces for the power and encoder board assemblies 238, 242 to secure the board assemblies 238, 242 within the upper portion 22 (e.g., via fasteners extending through the respective board assembly 238, 242 and into the respective boss 246). The power and encoder board assemblies 238, 242 are printed circuit boards having opposing planar faces connected by edges. As shown in FIG. 5, the planar face of the substrate of the encoder circuit board assembly 242 defines a second plane P2 and the planar face of the substrate of the power circuit board assembly 238 defines a third plane P3. The second and third planes P2, P3 defined by the substrates of the encoder and power circuit board assemblies 242, 238 are parallel to one another and are both perpendicular to the first plane P1 defined by the substrate of the image sensor circuit board assembly 130.

The upper portion 22 includes an attachment structure 266 for mating with the attachment structure 146 of the lower portion 18. The attachment structures 146, 266 include mating guide or engagement features that interact with one another to position the two portions 18, 22, e.g., the respective housings thereof, relative to one another. As shown, the attachment structure 266 of the upper portion 22 includes flexible clips and the attachment structure 146 of the lower portion 18 includes slots that are formed by one or both of the chassis 114 and the outer housing 110. The flexible clips are insertable into the slots to position the lower and upper portions 18, 22 relative to one another. With these two portions 18, 22 aligned, the chassis 114 is positioned adjacent the lower wall 226 and apertures 166 (FIG. 3) in the chassis 114 are aligned with apertures 270 in the lower wall 226 of the upper portion 22. Fasteners 150 (FIG. 4) are inserted (e.g., threaded) through the aligned apertures 166, 270 to secure the lower portion 18 to the upper portion 22.

Figure 9:
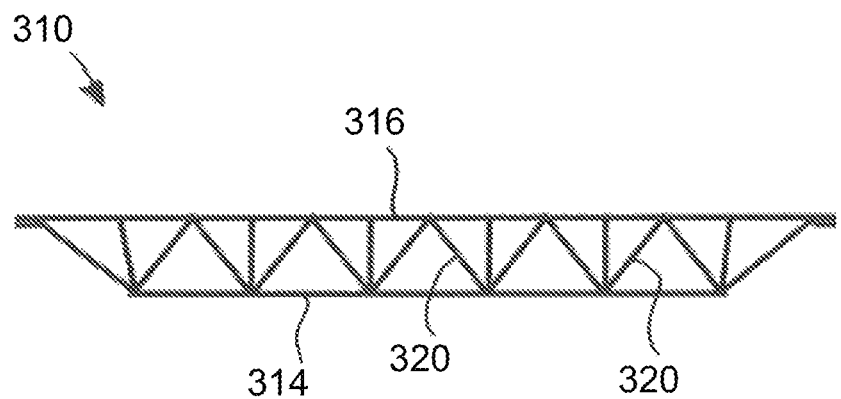
FIG. 9 is a side view of a conventional red iron truss, into which the camera of FIGS. 1-8 is adapted for mounting.
Figure 10:
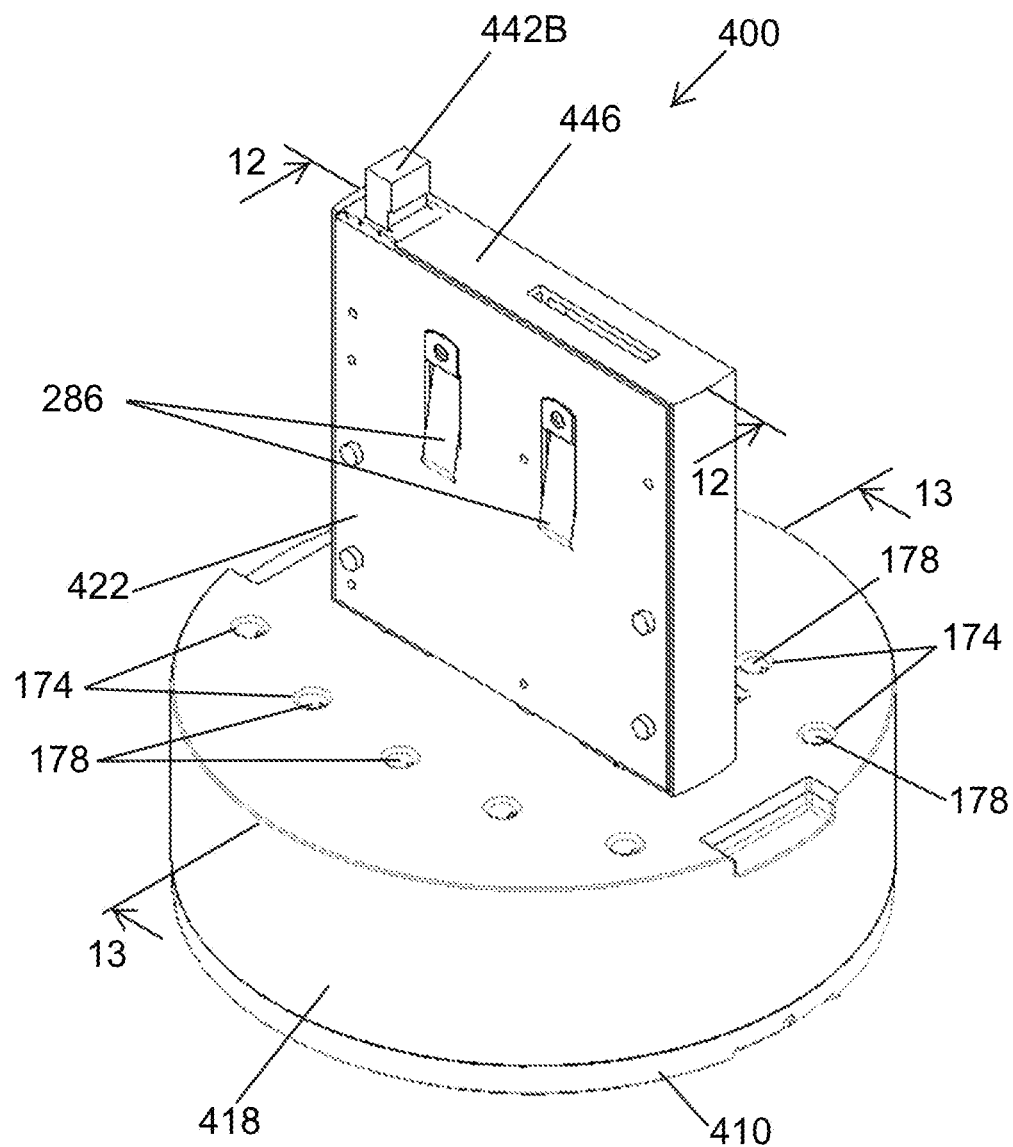
FIG. 10 is a perspective view of a truss mounting assembly for a camera or other security device according to another embodiment of the present disclosure.
Figure 11:
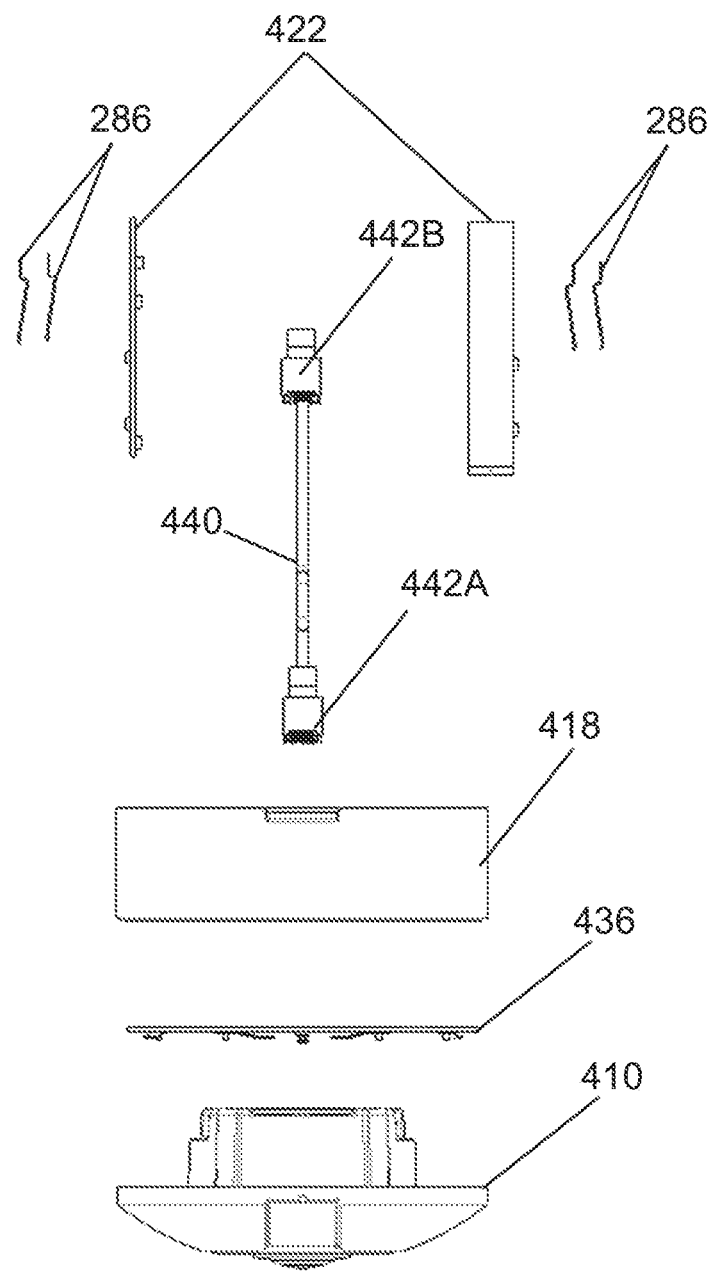
FIG. 11 is an exploded assembly view of the mounting assembly of FIG. 10.

The camera 10 includes features adapted to mount to a truss 310 such as a red iron truss or open web steel joist, often found in commercial and large retail buildings, an example of which is shown in FIG. 9. The truss 310 includes parallel chords 314, 316 connected to one another via a triangulated web system 320. A lower chord 314 of the truss 310 is shown in FIGS. 5-8 and is made of a ferromagnetic material such as iron. The lower chord 314 includes two beams 318 having L-shaped cross-sections with a vertical portion 322 and a horizontal portion 326. The two L-shaped beams 318 are arranged relative to one another such that the vertical portions 322 are parallel to one another and the horizontal portions 326 extend from the vertical portions 322 away from one another. The two beams 318 that form the lower chord 314 are fixed relative to one another via the triangulated web system 320 that is welded between the two beams 318 at various points along the length of the chord 314.

The two vertical portions 322 define interior surfaces 330 that collectively define a slot 334 between the two beams 318. As shown in FIG. 5, the slot 334 has a width W3. In some constructions, the width W3 is a standardized width of one inch plus/minus an acceptable tolerance (e.g., 0.25 inch, 0.125 inch, 0.0625 inch, 0.03125 inch). As shown, the width W3 of the slot 334 is greater than the width W2 of the upper portion 22, but is less than the width W1 of the lower portion 18. The width W1 of the lower portion 18 is less than the combined widths W3, W4 of the slot 334 and the two beams 318. Further, the length L3 of the slot 334 extends from a bottom surface 338 of the beams 318 to an upper surface 342 of the beams 318. The length L3 of the slot 334 is a standardized length of two inches plus/minus an acceptable tolerance (e.g., 0.25 inch, 0.125 inch, 0.0625 inch, 0.03125 inch), though in alternative trusses, the length of the slot may be different (e.g., four inches plus/minus an acceptable tolerance). As shown, the length L3 of the slot 334 is less than the length L2 of the upper portion 22. As the vertical and horizontal portions 322, 326 of each beam 318 are sized similar to one another, the width W4 of each horizontal portion 326 is similar to the length L3 of the slot 334.

The camera 10 includes a plurality of retention features for coupling and holding the camera 10 to the truss 310, and the retention features are adapted for attachment to the truss 310 without the use of tools. As shown in FIG. 2, the chassis 114 of the lower portion 18 includes a plurality of magnet bores 174 that each secure a magnet 178 therein. The magnet 178 may be, for example, a permanent magnet (e.g., a neodymium magnet). The magnet bores 174 extend from a rear surface of the lower portion 18 and more specifically a rear surface 154 of the chassis 114 at spaced apart locations. The bores 174 each extend in an axial direction parallel to the image sensor axis A1. As the width W1 of the lower portion 18 is greater than the width W2 of the upper portion 22, the magnets 178 are positioned at locations on the rear of the lower portion 18 where they are not covered by the upper portion 22 but are instead exposed. As shown, the lower portion 18 includes four magnet bores 174 on each side of the upper portion 22 for a combined eight magnet bores 174 collectively capable of supporting eight magnets 178.

As the truss 310 (and specifically the lower chord 314) is ferromagnetic, the magnets 178 are capable of coupling the camera 10 to the truss 310 via magnetic attraction between the magnets 178 and the lower chord 314. More specifically, the magnets 178 are capable of coupling the camera 10 to the truss 310 via magnetic attraction between the magnets 178 and the bottom surfaces 338 of the beams 318. The magnets 178 may be configured to provide a holding force in excess of the weight of the camera 10 so that the magnets 178 alone may be sufficient to maintain the camera 10 in the mounted position.

As shown in FIG. 2, the camera 10 can include a retention clip 286 as a further retention feature. As shown, each sidewall 214, 218 includes a retention clip 286. In some embodiments, each sidewall 214, 218 includes two or more retention clips 286. The retention clip 286 is attached to the respective sidewall 214, 218 via a fastener 290. In some embodiments, the retention clip 286 may be integrally formed with the sidewall 214, 218. The retention clip 286 is an elastic strip of plastic or metal and extends from the fastener 290 to a distal end of the clip 286 that is biased outward from the sidewall 214, 218 to a first position or holding position. The distal end of each clip 286 is elastically compressible inward toward the corresponding sidewall 214, 218 to a second position or a holding position. As shown, the sidewalls 214, 218 include respective apertures 294 positioned behind a portion of the retention clip 286, thereby allowing the retention clip 286 to compress to a position where a portion of the retention clip 286 is located inward of the sidewall 214, 218.

Figure 6:
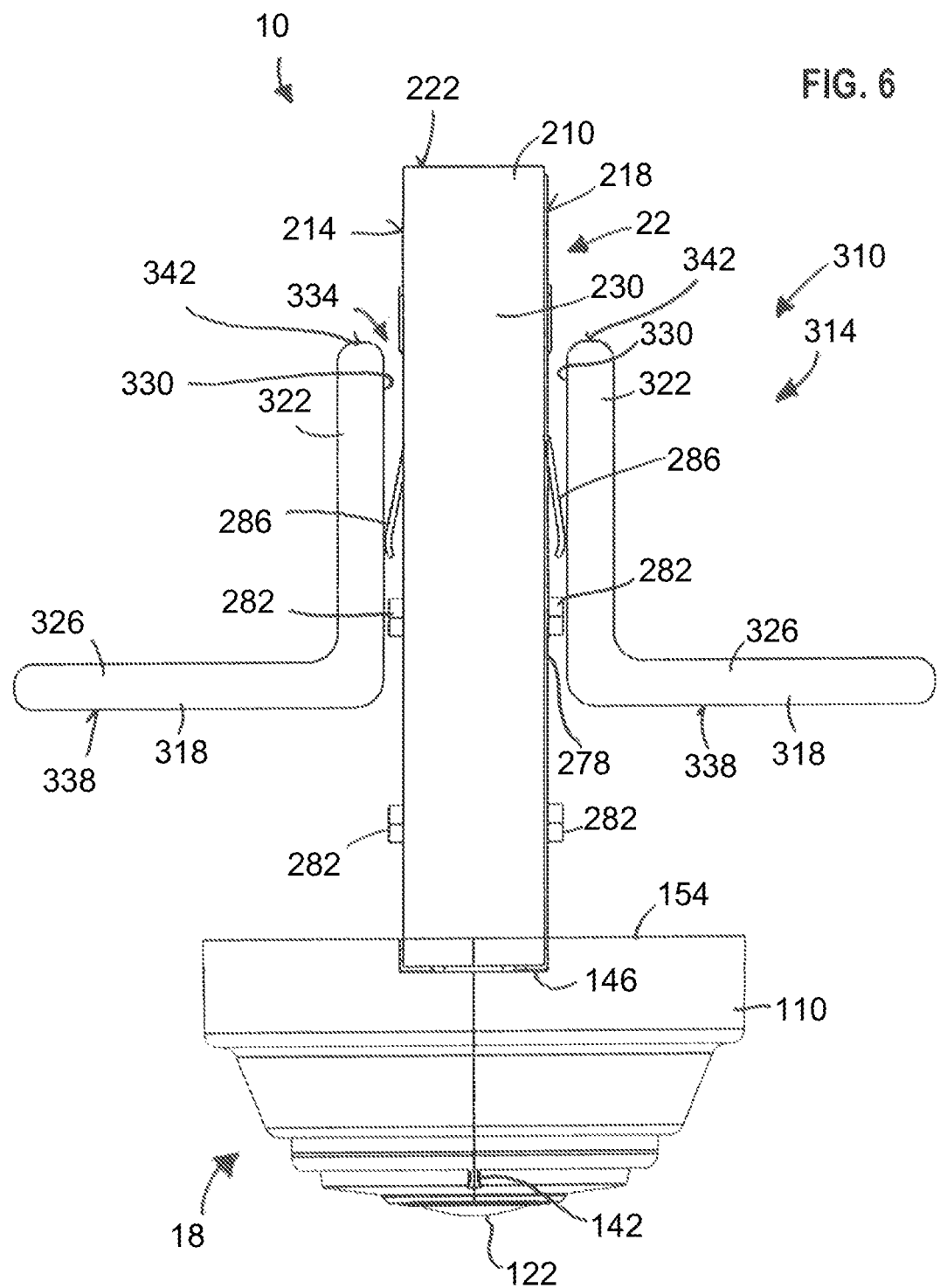
FIG. 6 illustrates the camera of FIG. 1 in an intermediate installation position.
Figure 7:
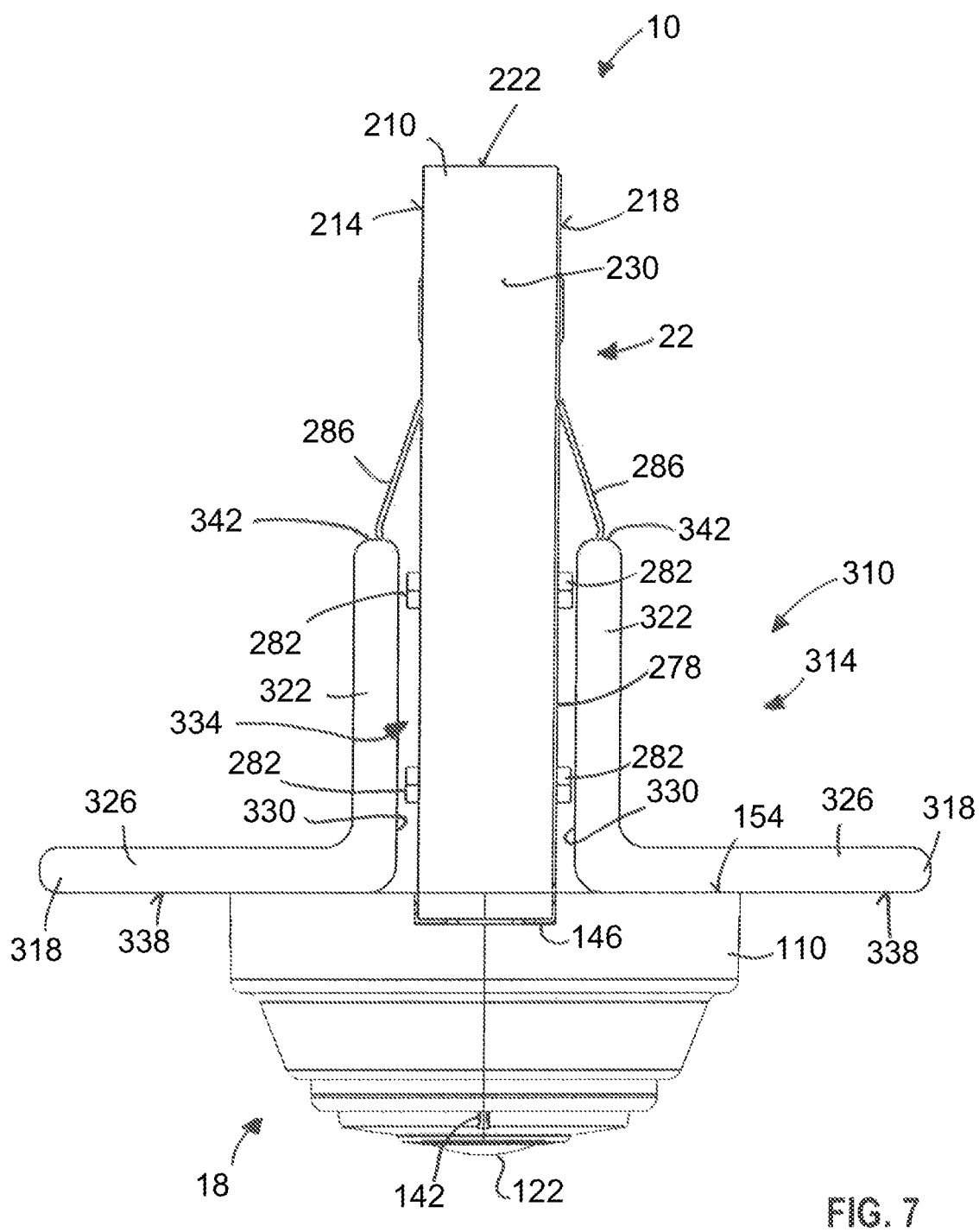
FIG. 7 illustrates the camera of FIG. 1 in a final installation position.
Figure 8:
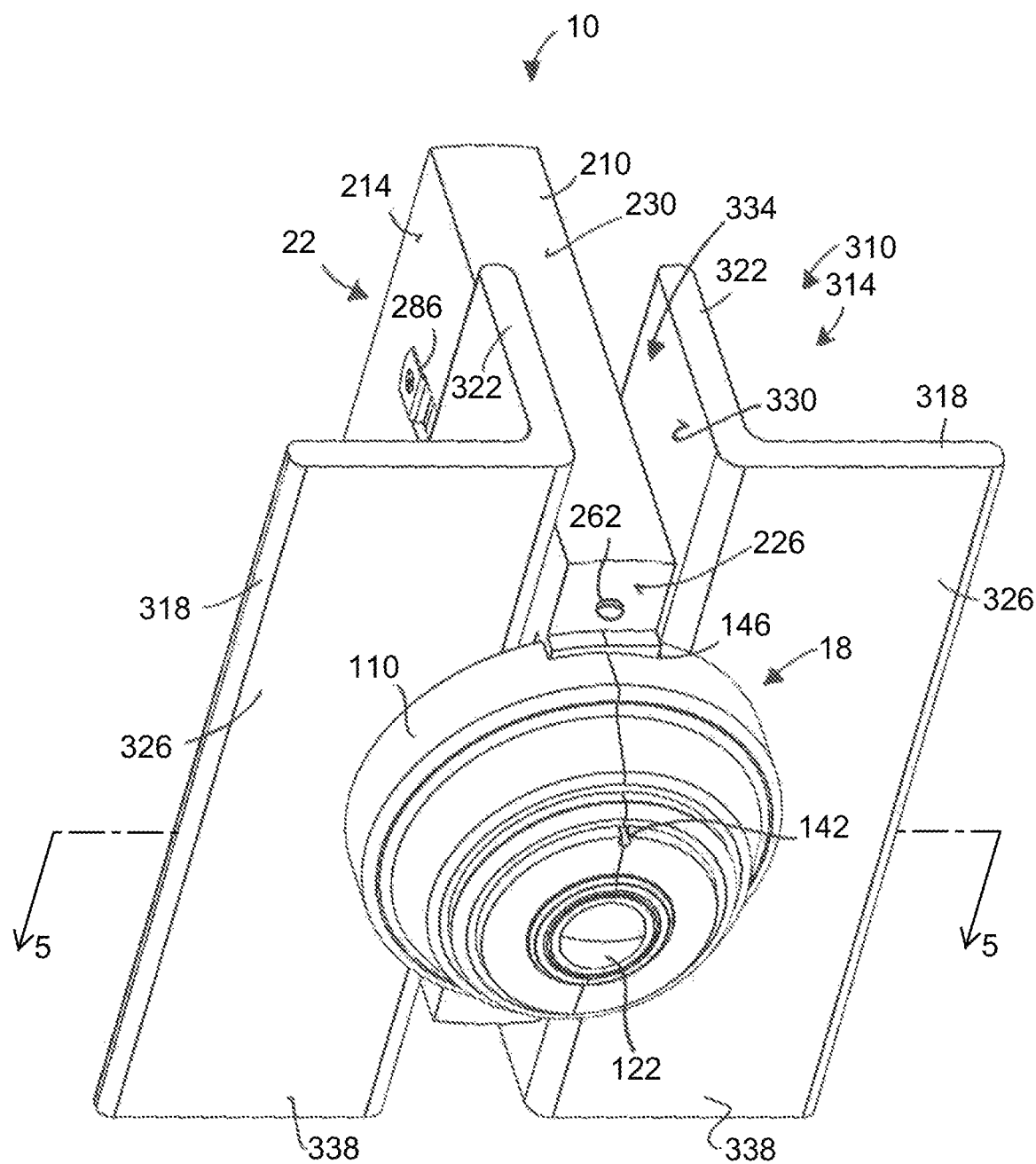
FIG. 8 is a perspective view of the camera of FIG. 1 installed within the truss.

As the truss 310 (and specifically the lower chord 314) includes a slot 334, the upper portion 22 can be inserted between the beams 318. As shown in FIG. 6, the retention clips 286 are compressed from their biased positions when the upper portion 22 is inserted into the slot 334. When the retention clips 286 exits the slot, they elastically expand to the holding position where the distal ends may be configured to engage the upper surfaces 342 of the beams 318, as shown in FIG. 7.

Each sidewall 214, 218 includes compliant buffers 282 extending from the surface of the sidewall 214, 218 to guide the upper portion 22 through the slot 334. The buffers 282 further prevent lateral movement of the upper portion 22 within the slot 334 when the camera 10 is installed within the truss 310. While the upper portion 22 is described above as being molded of a plastic material, one of the sidewalls 214, 218 may comprise a metallic material (e.g., formed of sheet metal) to function as a heat sink 278 for transferring heat from the power and encoder boards 242, 246 (among other electronics within the camera 10) to the metal truss 310. The heat transfer may be predominantly via radiation with some heat transfer via convection. In some embodiments, the compliant buffers may be positioned only on the sidewall 214 opposite the heat sink 278 such that the heat sink 278 is in direct contact with the truss 310, thereby transferring heat from the upper housing predominantly via conduction.

In operation, to install the camera 10 relative to the truss 310, the upper portion 22 is aligned with the slot 334 such that the width W2 of the upper portion 22 is vertically aligned within the width W3 of the slot 334. The upper portion 22 is moved linearly upward within the slot 334 as shown in FIG. 6, thereby compressing the retention clips 286 against the interior surfaces 330 of the beams 318. When the retention clips 286 are elastically compressed within the slot 334, the distance between the distal ends of the retention clips 286 is equal to the width W3 of the slot 334. The camera 10 is drawn magnetically upward by the magnetic attraction between the magnets 178 on the chassis 114 and the bottom surface 338 of the ferromagnetic truss 310. As the rear surface 154 of the chassis 114 magnetically engages the bottom surface 338 of the truss 310, the retention clips 286 pass the upper surface 342 of the beams 318 and spring outward to their biased, holding position. In the holding position, the retention clips 286 extend over the upper surfaces 342 of the beams 318.

As the size of the truss 310 and the length L3 of the slot 334 are formed within a specific tolerance, the retention clips 286 may be positioned at a height above the upper surfaces 342 of the beams 318 when the lower portion 18 abuts the underside 338 of the beams 318, thereby defining a gap between the distal end of the retention clip 286 and the upper surfaces 342 of the beams 318. Therefore, in some embodiments, the retention clips 286 may function as a backup or failsafe for the magnets 178. If there are large vibrations, for example, work on the roof above the truss 310, or an earthquake, that might otherwise shake the magnets 178 loose from the underside 338 of the truss 310, the retention clips 286 provide increased assurance that the camera 10 remains held in place relative to the truss 310. Further, the location of the retention clips 286 allows for displacement of the magnets 178 from the underside 338 of the truss such that the magnetic force of the magnets 178 is capable of automatically recoupling with the truss 310 if it is shaken off of the truss 310.

To uninstall the camera 10 from the truss 314, the retention clips 286 are manually compressed to a width less than the width W3 of the slot 334. Then, when the magnetic force between the magnets 178 and the truss 310 is overcome by a force along the image sensor axis A1, the camera 10 is moved downward until the upper portion 22 is removed from the slot 334.

The size and shape (e.g., width W2) of the upper portion 22 permits the upper portion 22 to fit within the slot 334 of the lower chord 314 of the truss 310, thereby concealing at least a majority of the upper portion 22 out of sight within the slot 334 and above the lower surface 338 of the truss 310. This feature aids in increasing covertness and makes the camera 10 less conspicuous. By locating some of the components of the camera 10 within the truss 310, the portion of the camera 10 below the truss 310 (i.e., the lower portion 18) is smaller and less conspicuous. The vertical orientation of the power and encoder circuit board assemblies 238, 242 (in contrast the horizontal orientation of the image sensor circuit board assembly 130) allows the upper portion 22 to have a profile that is narrow enough to fit within the slot 334.

Further, the mounting location (i.e., the truss 310) for the camera 10 is often at a substantial height above the ground. Providing single-motion, tool-less installation as described in detail above increases the efficiency and ease of installation by decreasing the installation time and simplifying the installation steps. While the packaging and retention features are shown and discussed above with respect to a camera 10, these features can be applied to other security devices including a thermal imaging camera, an infrared (IR) sensor, a fire sensor, a carbon monoxide sensor, or another building-mountable device for improving the security and/or safety of a building or area.

FIGS. 10 to 13 illustrate another embodiment that, like the first embodiment, allows for mounting of a camera or other security device at least partially into the slot 334 of a red iron truss 310. Common reference numbers are used where appropriate, and the description of the later embodiment is limited to those features differing from the first embodiment with the understanding that additional features are referenced to the preceding description and figures.

Figure 12:
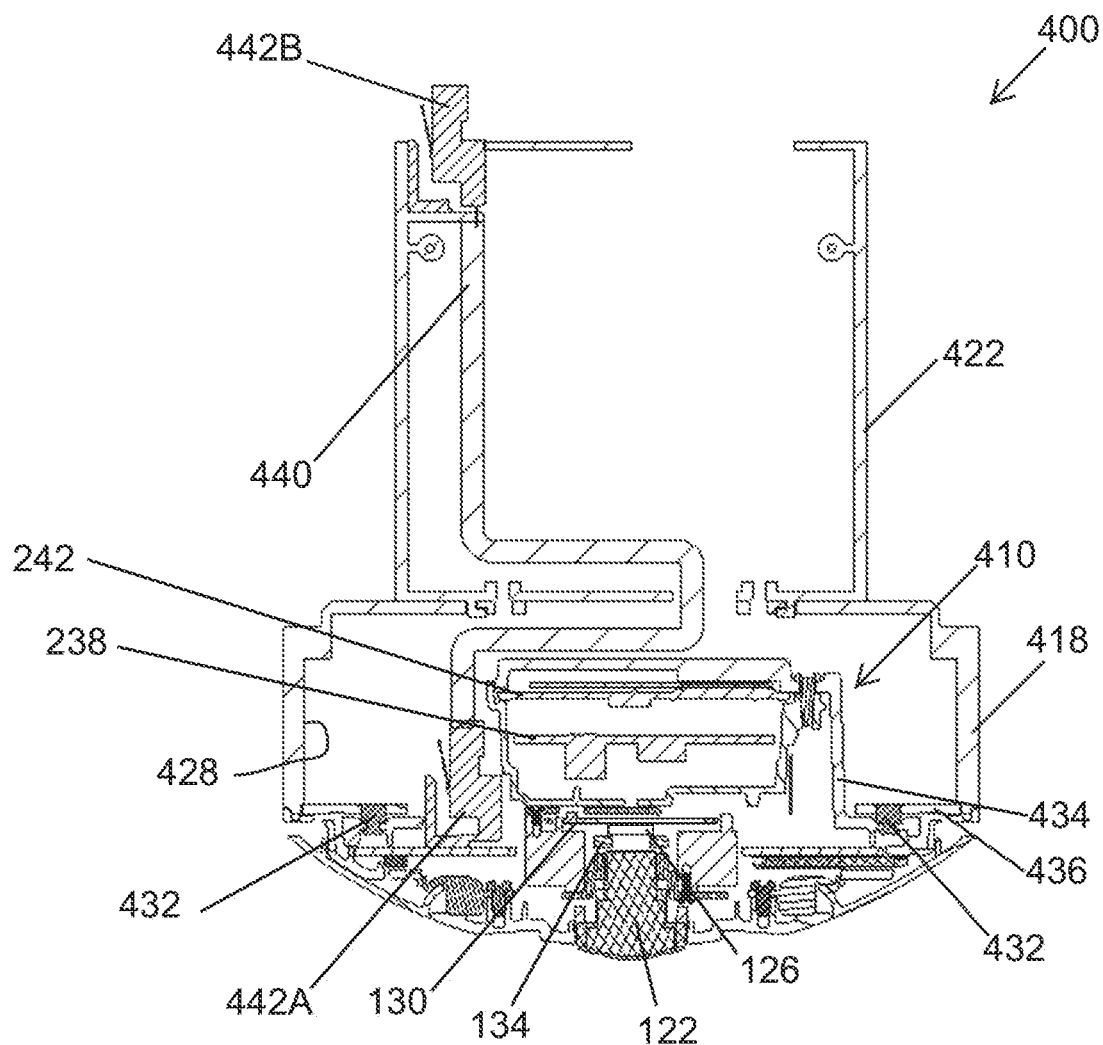
FIG. 12 is a cross-section view of the mounting assembly and camera, taken along line 12-12 of FIG. 10.
Figure 13:
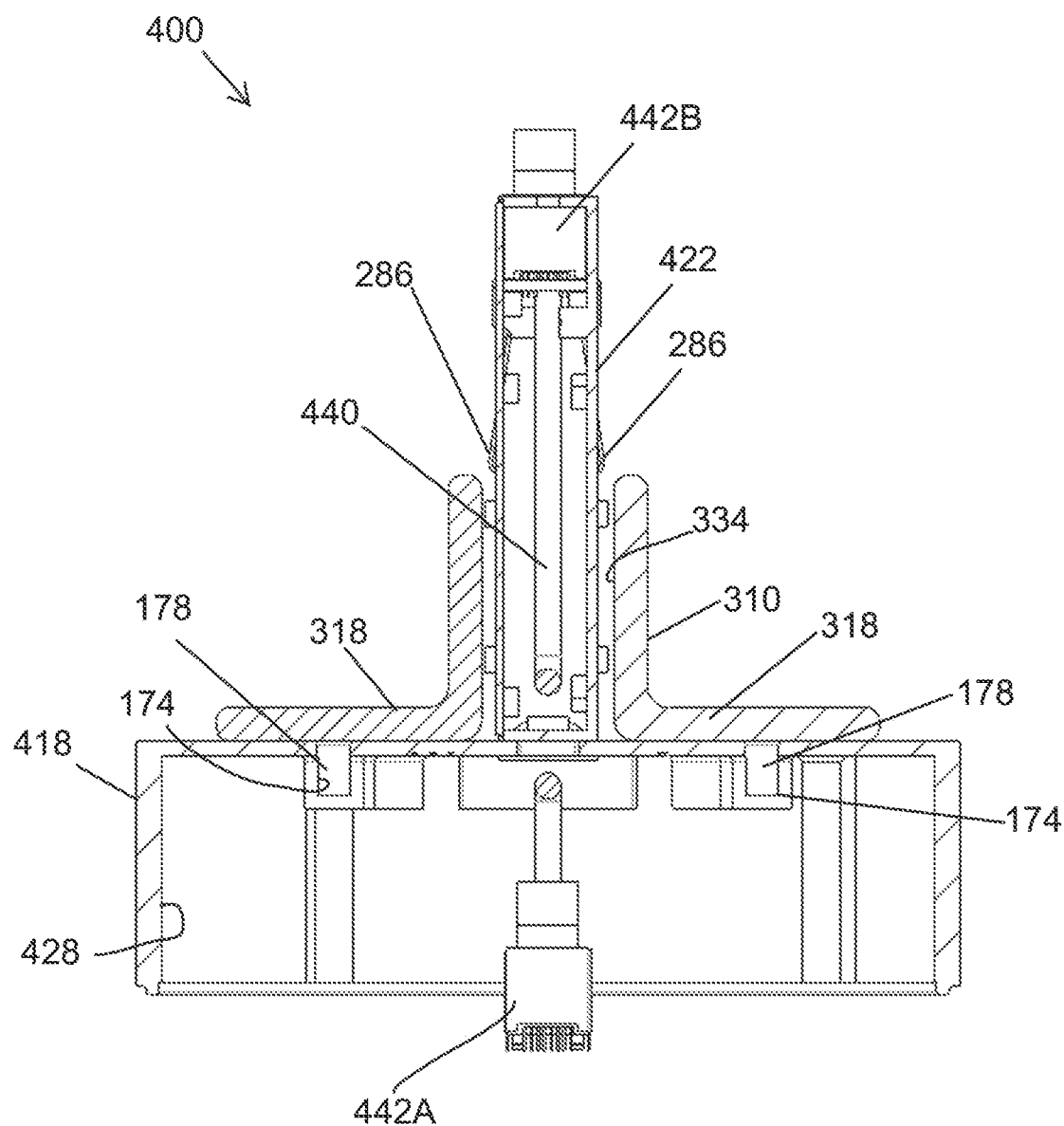
FIG. 13 is a cross-section view taken along line 13-13 of FIG. 10 of the mounting assembly. The mounting assembly is shown assembled into a truss slot, prior to installation of the camera.

As shown in FIGS. 10-13, the camera 410 or other security device is mounted to the bottom part of a two-part adapter or mounting assembly 400 that fits at least partially into the truss slot 334 (FIG. 13). The mounting assembly 400 comprises a first or lower portion 418 and a second or upper portion 422. As will be appreciated from the following disclosure, the lower portion 418 receives and/or mounts the camera 410, while the upper portion 422 extends into the truss slot 334. The lower portion 418 includes an outer housing or shell similar in many respects to the outer housing or shell 110 of the camera 10. The upper portion 422 includes an outer housing or shell similar to the outer housing or shell 210 of the camera 10. The overall sizes and shape factors of the portions 418, 422 of the mounting assembly 400 are similar to the camera portions 18, 22 of the first embodiment. Further, the upper portion 422 includes a plurality of retention clips 286 (e.g., two per side as shown) that operate in the same manner as those of the camera 10. Particularly, the retention clips 286 snap over the upper edges of the truss beams 318 and serve as a back-up or failsafe to one or more magnets 178 that magnetically couple the mounting assembly 400 to the iron truss 310. The magnets 178, which can be permanent magnets as described above with reference to the camera 10, can be provided in or near an upper surface of the lower portion 418 of the mounting assembly 400 (e.g., in magnet bores 174). As best shown in FIGS. 12 and 13, the lower portion 418 forms a cavity 428 that at least partially surrounds (e.g., surrounds a majority of) the camera 410. In some constructions, the camera 410 is a surveillance camera of a conventional construction. The camera 410 can be securely coupled to the lower portion 418 with one or more mounts (e.g., bayonet mounts 432 in between an outer housing 434 of the camera 410 and a trim ring 436, allowing tool-less connection/disconnection by combination axial and rotational relative movement). The lower and upper portions 418, 422 can be fastened together similar to the camera portions 18, 22, or in other ways. In some constructions, the lower and upper portions 418, 422 are integrally formed (e.g., molded) as a single piece.

As opposed to the camera 10, the various circuit boards of which are distributed between the lower and upper portions 18, 22 so that at least one circuit board is located in the upper portion 22 between the truss beams 318, the camera 410 (including the power circuit board assembly 238 and the encoder circuit board assembly 242, in addition to the basic camera elements of the lens or lens assembly 122, image sensor 126, image sensor circuit board assembly 130, and the filter 134) is wholly positioned below the truss beams 318 and below the upper portion 422. The interior of the upper portion 422 can be devoid of camera components or of electronic components as a whole, in some constructions. As shown, the upper portion 422 facilitates passage of a connection cable 440 (e.g., Ethernet), while no electronic components for processing camera data are provided within the upper portion 422. One plug 442A of the cable 440 is connected to the camera 410 within the lower portion 418, and the other plug 442B of the cable 440 is presented, e.g., for network connection, above the truss 310. As shown, the second plug 442B is presented at the upper wall 446 of the upper portion 422. This is one example of how the upper portion 422 can function as an I/O interface, having at least one I/O port for connecting the camera 410 to a surveillance network, despite the upper portion 422 not forming part of the camera 410, per se. In other constructions, the upper portion 422 may contain electronics on one or more circuit boards, separate from the camera 410 and electrically coupled to the camera 410 and operable to perform post-processing of video data from the camera 410, including encoding and/or content analysis. For example, video or other data can be enhanced in quality (e.g., contrast), intelligent video analytics can be performed, a web server may be provided, additional I/O port(s) provided, metadata can be added to the video, additional data (audio) can be combined or overlaid with the video from the camera 410.

Various features of the disclosure are set forth in the following claims.

What is claimed is:

1. A security device adapted to mount within a ferromagnetic truss, the security device comprising:
   a sensing element;
   a first housing portion provided around the sensing element;
   a second housing portion positioned above the first housing portion and provided around a circuit board electrically coupled to the sensing element;
   a magnet provided on the first housing portion and operable to magnetically couple the security device to the ferromagnetic truss, and
   a retention clip provided on the second housing portion and operable to automatically secure the security device within the truss when inserted from below.

2. The security device of claim 1, wherein the security device is a camera.

3. The security device of claim 1, wherein the retention clip is elastically compressible against the second housing portion from a holding position to a release position.

4. The security device of claim 1, wherein the first housing portion extends axially from a lens to a rear surface, wherein the sensing element collects light through the lens and wherein the magnet is positioned at the rear surface.

5. The security device of claim 4, wherein the second housing portion includes a front surface and a rear surface opposite the front surface, wherein the front surface of the second housing portion is located at the rear surface of the first housing portion, and wherein the retention clip is located between the front and rear surfaces of the second housing portion.

6. The security device of claim 1, wherein a plane of the circuit board in the second housing portion is oriented perpendicular to a plane of the sensing element.

7. The security device of claim 1, wherein the second housing portion includes a first planar wall and a second planar wall, wherein at least one of the first and second planar walls comprises a metallic material configured to generate heat transfer between the security device and the truss.

8. The security device of claim 1, further comprising one or more I/O ports located at a rear end of the second housing portion.

9. A method of mounting a security device to a truss, wherein the security device includes a first housing portion and a second housing portion, and wherein the truss includes two spaced beams defining a slot therebetween, the method comprising:
   aligning the second housing portion with the slot;
   inserting the second housing portion into the slot; and
   automatically securing the security device to the truss by the insertion of the second housing portion into the slot.

10. The method of claim 9, further comprising compressing a retention clip on the second housing portion when inserting the second housing portion into the slot.

11. The method of claim 9, further comprising magnetically coupling the first housing portion to the underside of the truss.

12. The method of claim 11, wherein a retention clip engages a top side of the truss when the first housing portion is magnetically coupled to the underside of the truss.

13. The method of claim 11, wherein the first housing portion contains a sensing element, wherein the second housing portion contains a circuit board in electrical communication with the sensing element such that the circuit board is positioned within the slot of the truss when the first housing portion is magnetically coupled to the truss.

14. The method of claim 13, wherein the sensing element is positioned outside the slot of the truss when the first housing portion is magnetically coupled to the truss.

15. The method of claim 9, wherein the slot of the truss is defined by first and second opposing surfaces, wherein the second housing portion includes opposing sidewalls, and wherein aligning the second housing portion with the slot includes aligning the opposing sidewalls with the first and second opposing surfaces of the slot.

16. A security device adapted to mount within a slot of a ferromagnetic truss, wherein the slot has a standardized width of one inch, the security device comprising:
   a sensing element;
   a first housing portion containing the sensing element, the first housing portion extending in an axial direction from a lens to a rear surface of the first housing portion, the first housing portion having a width at the rear surface of greater than one inch measured perpendicular to the axial direction;
   a second housing portion attached to the first housing portion, the second housing portion containing a circuit board electrically coupled to the sensing element, the second housing portion having a width of less than one inch measured parallel to the width of the first housing portion; and
   a magnet coupled to the first housing portion and operable to magnetically couple the first housing portion to the ferromagnetic truss.

17. The security device of claim 16, further comprising a retention clip provided on the second housing portion, wherein the retention clip is elastically compressible against the second housing portion from a holding position to a release position.

18. The security device of claim 16, wherein the second housing portion is positioned axially rearward of the rear surface of the first housing portion.

19. The security device of claim 16, wherein the first and second housing portions are formed as independent housings, the first housing portion being physically and non-magnetically coupled to the second housing portion.

20. The security device of claim 16, wherein the magnetic pole is parallel with the axial direction.

* * * * *